Dec. 17, 1957  E. P. AUSTIN ET AL  2,816,657
MEANS FOR SEPARATING PARTICLES SUSPENDED IN LIQUID
Filed Oct. 1, 1953
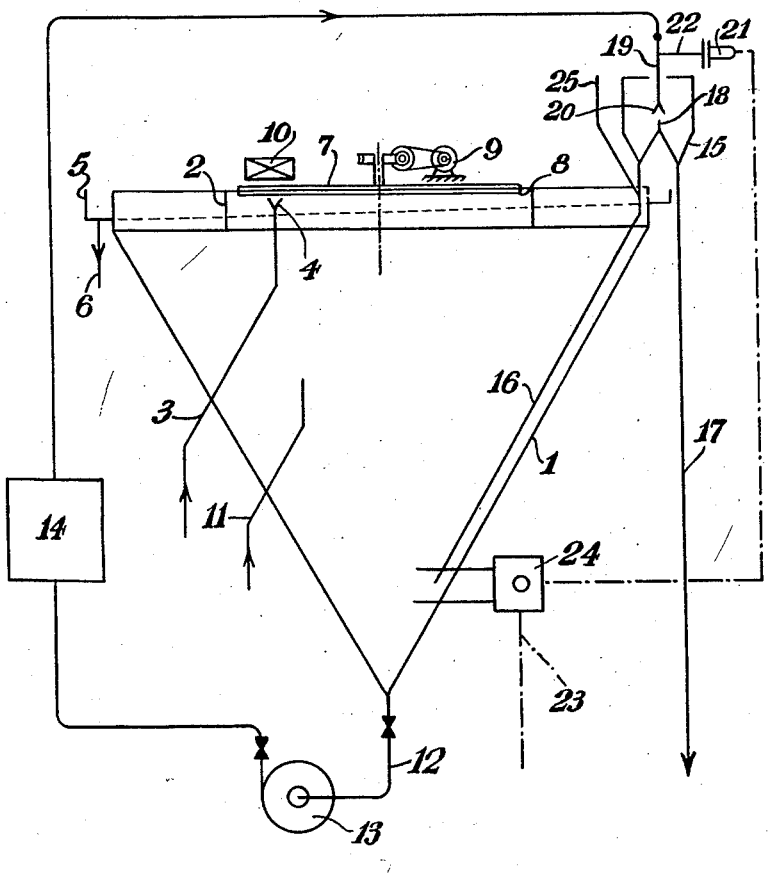
Inventors
E. P. Austin
H. McCallum
By
Attys.

United States Patent Office 2,816,657
Patented Dec. 17, 1957

2,816,657

MEANS FOR SEPARATING PARTICLES SUSPENDED IN LIQUID

Eric Paul Austin and Hugh McCallum, Cheadle Heath, Stockport, England, assignors to Simon-Carves Limited, Stockport, Cheshire, England, a British company Application October 1, 1953, Serial No. 383,629

Claims priority, application Great Britain July 10, 1953

5 Claims. (Cl. 209—8)

This invention relates to means for separating magnetisable and non-magnetisable constituents in suspensions of particles in liquids, and more especially to apparatus for separating non-magnetisable and magnetisable particles in medium which has been used in sink-and-float coal or ore washing plant and for regenerating such medium.

The apparatus according to the invention comprises a settling tank, means for magnetising magnetisable particles in a suspension fed to the tank so that they become agglomerated and settle in the tank, means allowing escape of liquid and non-magnetisable particles at the top of the tank, means for withdrawing liquid and magnetic particles from the bottom of the tank and passing same through a demagnetiser, and returning same to the lower part of the tank, or, when the suspension is of correct density, diverting some or all of it for re-use.

According to a further feature of the invention, the suspension passes from the demagnetiser to a splitter box from which it can flow to the lower part of the tank, or to an offtake, or to both, as required.

The accompanying drawing shows diagrammatically a convenient arrangement in accordance with this invention.

In the example shown in the drawing, there is a settling tank 1 in the form of a hollow cone with its apex at the bottom. The top of the cone is open, and a non-magnetic annular wall 2, which may be cylindrical or conical is supported centrally at the top of the cone, so that its lower edge is below the normal level of liquid in the tank 1. The used medium, which consists of a slurry or suspension of finely-divided magnetisable and non-magnetisable particles in a liquid such as water, is fed to the tank 1 by a pipe 3 which has a divergent nozzle 4 opening slightly below the liquid level in the tank 1, eccentrically within the annular wall 2. A channel 5 with outflow pipe 6 surrounds the cone 1 and receives material overflowing over the top edge of the cone.

A spinner disc 7 of non-magnetic material is mounted centrally within the wall 2, just above the liquid and above the opening of the nozzle 4, with a rim 8 on its underside dipping into the liquid, and means such as a motor 9 are provided for slowly rotating it about a vertical axis. An electromagnet 10 is placed above the disc 7 and directly above the nozzle 4 to produce a local, highly concentrated magnetic field.

As the medium fed to the tank 1 is discharged directly beneath the magnet 10, magnetisable particles contained in the medium are drawn on to the spinner disc 7, and are magnetised so that they agglomerate by mutual attraction. As the disc 7 rotates, the agglomerated particles adhering to it are carried out of the magnetic field and then drop from it and sink to the bottom of the cone. The non-magnetisable particles are not affected and they flow away with the liquid. In order to improve the upflow in the cone 1 when large quantities of slimes have to be removed, a pipe 11 is provided through which water is injected in an upward direction from a lower level than the medium inlet.

At the bottom of the cone 1 is a discharge pipe 12 through which the magnetised particles, having been subjected to the densifying action of the cone, are drawn off together with some liquid as a magnetic concentrate, which is pumped by a pump 13 through a demagnetiser 14 to a splitter box 15. The box 15 has two compartments in its lower part, and from the bottom of one compartment a pipe 16 leads to the lower part of the interior of the cone 1, while from the bottom of the other compartment an offtake pipe 17 leads to the place where the concentrated and demagnetised suspension is required, such as a coal or ore washing plant.

The splitter box 15 has a partition 18 between its two compartments but not reaching to the top of the box, and there is an inlet pipe 19 with an outlet 20 above the partition, which is movable so that the suspension can be directed to one or other side of the partition, or partly to one side and partly to the other. The pipe 19 may be displaced manually, or as shown in the drawing, by a pneumatic device 21 having an operating rod 22 driven by a diaphragm. Compressed air is supplied to the device 21 by a pipe 23, through a regulator 24 which is controlled by a density measuring device mounted in the lower part of the cone 1, the arrangement being such that as long as the suspension in the cone has not reached a sufficient density, demagnetised suspension is returned to the cone where it receives further magnetic particles and is then recirculated. Usually there will be recirculation of a part of the suspension when the apparatus is working normally. There is an air vent in the pipe 16 from the splitter box 15 to the lower part of the cone 1, preferably just below the level of the liquid in the cone, to eliminate air locks in the pipe 16 and prevent entrained air bubbling up in the cone and interfering with the settling of the magnetised particles. The vent may be a pipe 25 branching laterally as shown in the drawing.

The arrangement according to the invention has the advantage that there is a flow of homogeneous medium which is partly demagnetised into the lower part of the cone, so that any tendency for the magnetic material to settle on the sides of the cone, due to high settling rate and lack of agitation, is greatly reduced. The measurement of the density near the base of the cone is reliable because the density is most uniform in this zone. Additional circulating equipment to a separate demagnetiser, involving increased maintenance and operational costs is eliminated.

What we claim is:

1. Means for separating magnetisable and non-magnetisable constituents in suspensions of particles in liquids, comprising a settling tank, means for magnetising magnetisable particles in a suspension fed to the tank so that they become agglomerated and settle in the tank, means allowing escape of liquid and non-magnetisable particles at the top of the tank, means for withdrawing liquid and magnetised particles from the bottom of the tank, a demagnetiser to which said liquid and magnetised particles are passed, a receiver for liquid and demagnetised particles coming from the demagnetiser, two outlets from the receiver, means connecting one of said outlets to the lower part of the tank, and the other of said outlets to an offtake, and means for causing the material in the receiver to pass to one or both of said outlets, in accordance with the density of the suspension in the lower part of the tank.

2. Means as claimed in claim 1, having an additional liquid inlet to the settling tank to admit liquid in an upward direction beneath the suspension inlet.

3. Means for separating magnetisable and non-magnetisable constituents in suspension of particles in liquids, comprising a settling tank, means for magnetising magnetisable particles in a suspension fed to the tank so that they become agglomerated and settle in the tank, means allowing escape of liquid and non-magnetisable particles at the top of the tank, means for withdrawing liquid and magnetised particles from the bottom of the tank, a demagnetiser to which said liquid and magnetised particles are passed, a receiver for liquid and demagnetised particles coming from the demagnetiser, two outlets from the receiver, means connecting one of said outlets to the lower part of the tank, and the other of said outlets to an offtake, and means for causing the material in the receiver to pass at least partly to the said lower part of the tank through the said first outlet and causing the remainder of the said material to pass to the said offtake in accordance with the density of the suspension in the lower part of the tank.

4. Means as claimed in claim 1, in which the means for causing the material in the receiver to pass to one or both of its outlets comprise a pneumatic device, to which compressed air is supplied through a regulator controlled by a density measuring device.

5. Means as claimed in claim 1, having a pipe which delivers demagnetised suspension to the lower part of the tank, and an air vent from the pipe at or near the liquid level in the tank.

References Cited in the file of this patent
UNITED STATES PATENTS

| | | |
|---|---|---|
| 2,320,519 | Hirst | June 1, 1943 |
| 2,373,635 | Wuensch | Apr. 10, 1945 |
| 2,521,347 | Davis | Sept. 5, 1950 |
| 2,612,262 | Symington et al. | Sept. 30, 1952 |
| 2,633,987 | Bean | Apr. 7, 1953 |